(12) United States Patent
True et al.

(10) Patent No.: US 6,544,138 B2
(45) Date of Patent: Apr. 8, 2003

(54) ELECTRO-HYDRAULIC MODULE FOR AUTOMATIC TRANSMISSION CONTROL

(75) Inventors: Ryan M. True, Clawson, MI (US); Howard W. Saxon, Clinton Township, MI (US); David Mills, Clinton Township, MI (US)

(73) Assignee: Borg-Warner Automotive, Inc., Troy, MI (US)

( * ) Notice: Subject to any disclaimer, the term of this patent is extended or adjusted under 35 U.S.C. 154(b) by 0 days.

(21) Appl. No.: 09/851,541

(22) Filed: May 8, 2001

(65) Prior Publication Data

US 2002/0166409 A1 Nov. 14, 2002

(51) Int. Cl.[7] ............................................... F16H 31/00
(52) U.S. Cl. ..................................... 475/116; 74/606 R
(58) Field of Search ................................. 475/116, 161; 74/606 R, DIG. 1

(56) References Cited

U.S. PATENT DOCUMENTS

| | | | | | |
|---|---|---|---|---|---|
| 5,417,124 A | * | 5/1995 | Huff et al. | ..................... | 74/335 |
| 5,811,747 A | * | 9/1998 | Taniguchi et al. | ....... | 200/61.88 |
| 6,164,160 A | * | 12/2000 | Nassar | ........................ | 29/840 |

* cited by examiner

Primary Examiner—Sherry Estremsky
Assistant Examiner—Tisha D. Lewis
(74) Attorney, Agent, or Firm—Warn, Burgess & Hoffmann, P.C.; Greg Dziegielewski

(57) ABSTRACT

A control module for a vehicle transmission. The control module includes an electronic transmission control unit attached to a cooling plate. Control solenoids are attached to the cooling plate. The cooling plate is operably secured over a "worm trail" manifold in a transmission for controlling the transmission.

23 Claims, 5 Drawing Sheets

ELECTRO-HYDRAULIC MODULE FOR AUTOMATIC TRANSMISSION CONTROL

TECHNICAL FIELD

The present invention relates to solenoid control of a vehicle transmission. More specifically, the present invention relates to a combined electronic transmission control unit and solenoid module which is adaptable for onboard attachment to a transmission.

BACKGROUND OF THE INVENTION

Electronically controlled automatic transmissions have become common place in today's vehicles. Typically, these transmissions require transmission control units which monitor and control shifting patterns for the vehicles. Typically, these transmission control units are remote from the transmission and integrated with the engine control unit.

Transmission control requires hydraulic flow and pressure to be metered and routed, typically by use of solenoids. The hydraulic flow is routed by worm trails and passages in a transmission valve body. The solenoids are mounted in a relatively complex manifold which has passages and worm trails for corresponding to the worm trails in the transmission's valve body. The solenoids are, therefore, housed integrally with a separate add-on manifold and require a complex manifold design for interacting with the transmission. Typically, the solenoids are connected to a wiring connector on the manifold which connects to a wiring harness of the vehicle. The wiring harness of the vehicle connects to a remotely mounted transmission control module of the engine control unit of the vehicle. Until recent years, it has been necessary to have the transmission control unit placed somewhere other than in the engine compartment since the transmission control unit was exposed to more heat and other harsh conditions if placed close to the transmission. Thus, typically it is necessary to have a complex wiring harness extending to the remotely mounted transmission solenoid module. Such a harness in existing designs is heavy and complex, and may lead to undesirable open circuits or electrical shorts along the wiring harness assembly. Additionally extra labor is required for installing the wiring harness.

In the motor vehicle industry today, weight has been a critical consideration in vehicles. It has been desirable to provide transmission control units which are attached to the transmission. Due to recent improvements in solid state component technology, it has become feasible to design transmission control units into the transmission. Typically, this new design implements a control unit attached to a cooling plate acting as a heat sink, which is then mounted onto a suitable portion of the transmission. A wiring harness is then utilized to connect the solenoid manifold with the control unit. Thus, even in the new design, a complex wiring harness has typically been connected between the transmission control unit and the solenoid manifold. Additionally, these new designs include a solenoid manifold which is a separate assembly from the transmission, which adds weight to the overall transmission assembly.

Therefore, it has been a goal in the art to further reduce weight and simplify transmission control in electronic transmissions today.

SUMMARY OF THE INVENTION

In accordance with the present invention, the integral cooling plate of the transmission control unit has hydraulic control solenoids mounted on the cooling plate. The plate assembly is mounted onto the transmission and is matched to a transmission valve body having "worm trail" passages for controlling hydraulic flow in the transmission.

Thus, the transmission control plate of the present invention reduces wiring weight and size, and simplifies control of the transmission by directly interfacing the hydraulic portion of the transmission with a transmission control unit. It also reduces size and weight, in that the solenoids are no longer required to be attached to a separate solenoid manifold. This invention also allows combining of parts which are normally separately attached to the transmission itself.

A further understanding of the present invention will be had in view of the description of the drawings and detailed description of the invention, when viewed in conjunction with the subjoined claims.

DETAILED DESCRIPTION OF THE PREFERRED EMBODIMENTS

Figure 1:
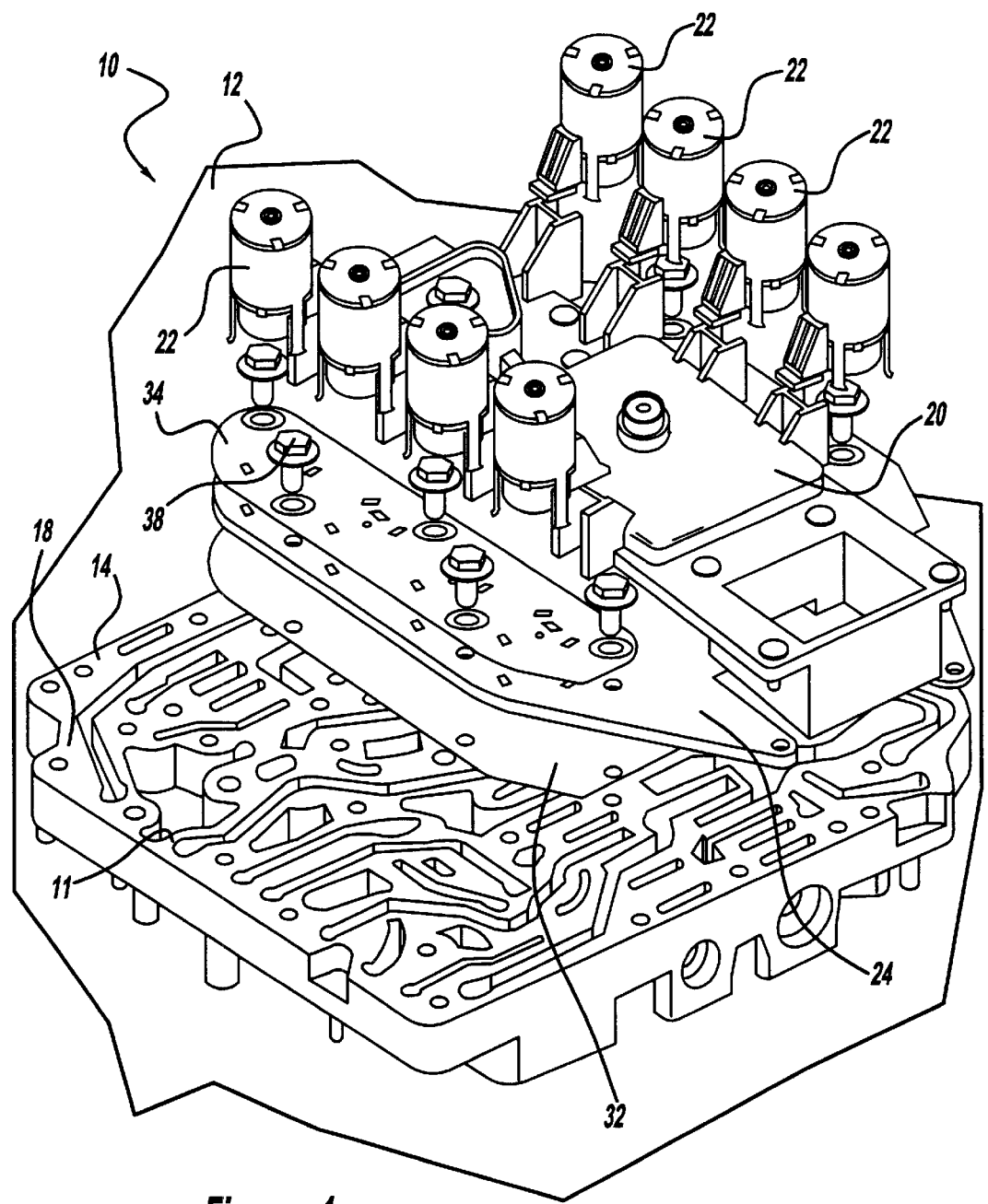
FIG. 1 is an exploded view of the control module assembly components of the present invention.
Figure 2:
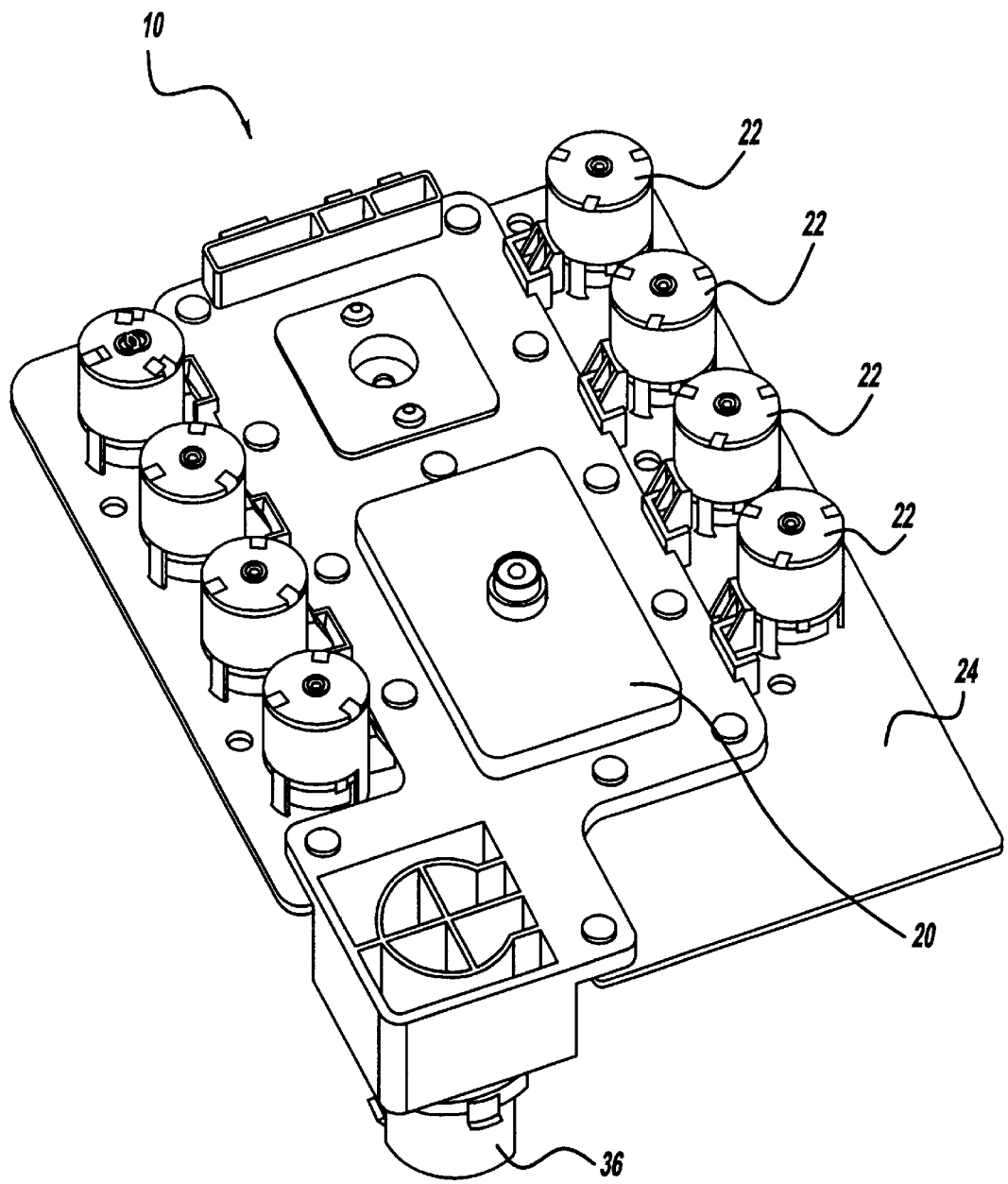
FIG. 2 is a perspective view of the assembled control plate made in accordance with the teachings of the present invention.
Figure 3:
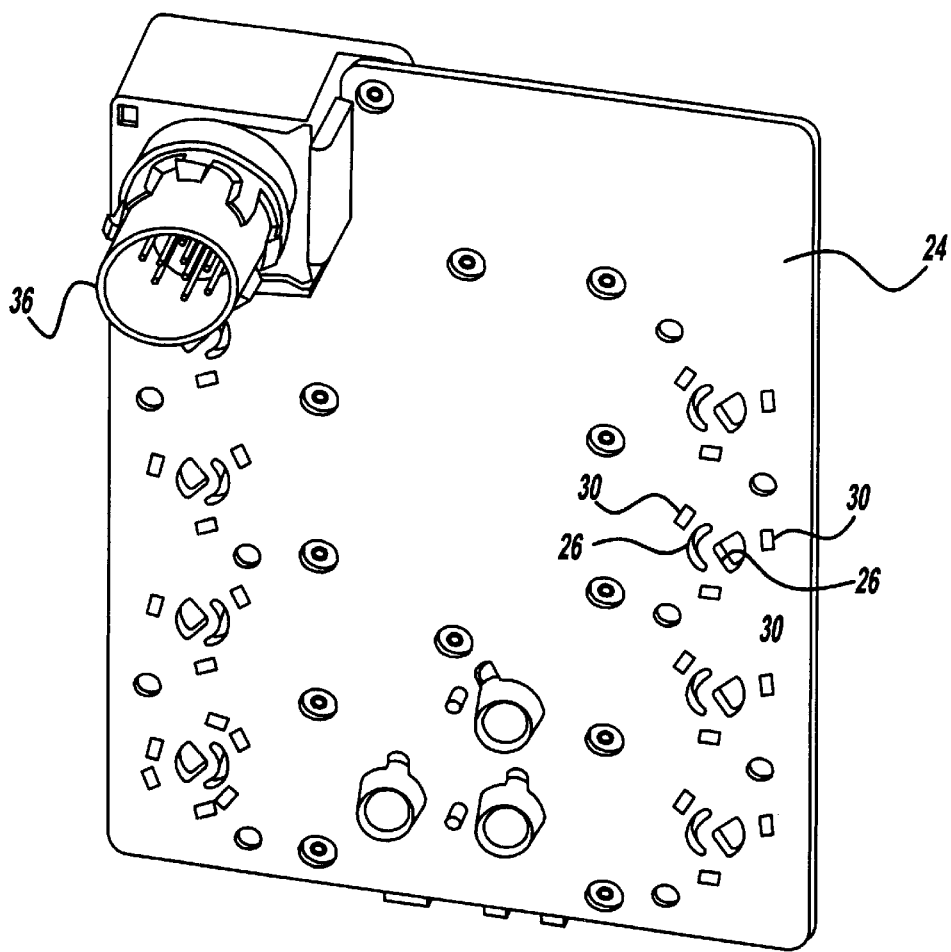
FIG. 3 is a perspective view of the bottom of the control module of FIG. 2.
Figure 4:
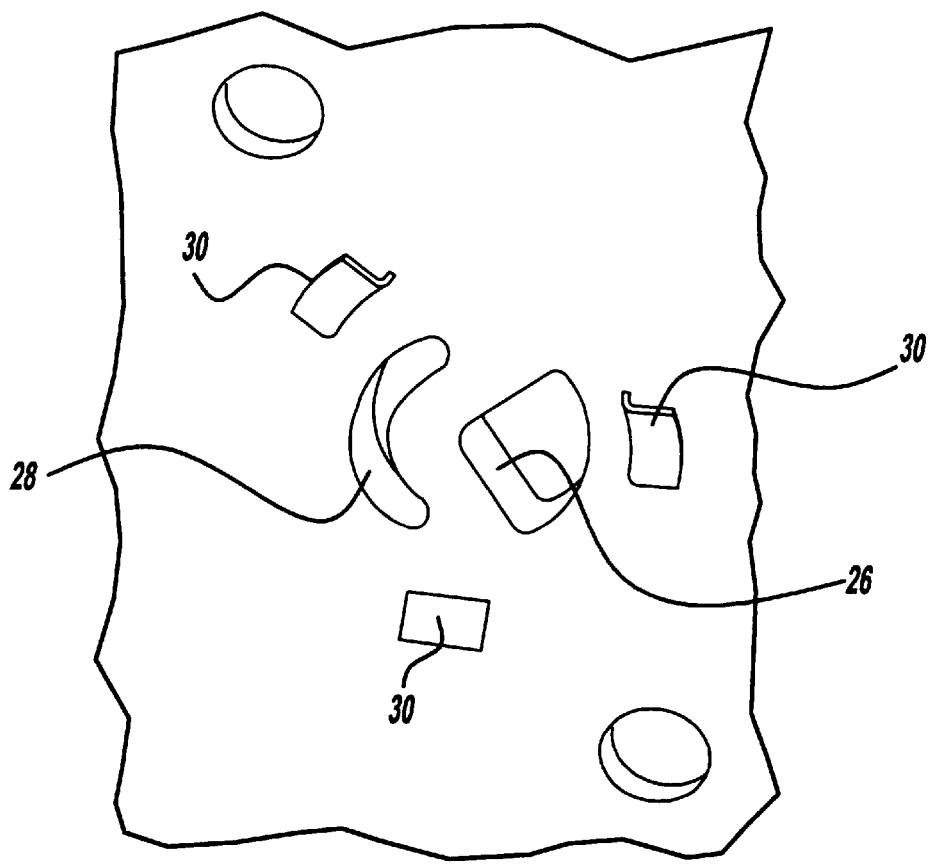
FIG. 4 is a detailed perspective view showing the hydraulic ports for solenoid control of the transmission.

Referring now to the drawings, and in particular FIG. 1, in accordance with the present invention, there is provided a transmission control module for a motor vehicle transmission, generally shown at 10. The transmission control module is adapted for use on a vehicle transmission 12. This module may consist of solenoids, pressure switches, sensors, connectors, and cooling/mounting plate 24. Transmission 12 includes a valve body 14. Valve body 14 includes a series of worm trails, generally shown at 16. Worm trails 16 provide hydraulic flow passages for hydraulic control of shift clutches and the like in the transmission 12. The valve body 14 has an outer peripheral flange 18, over which the module 10 sealingly engages by attachment fasteners 38.

Figure 5:
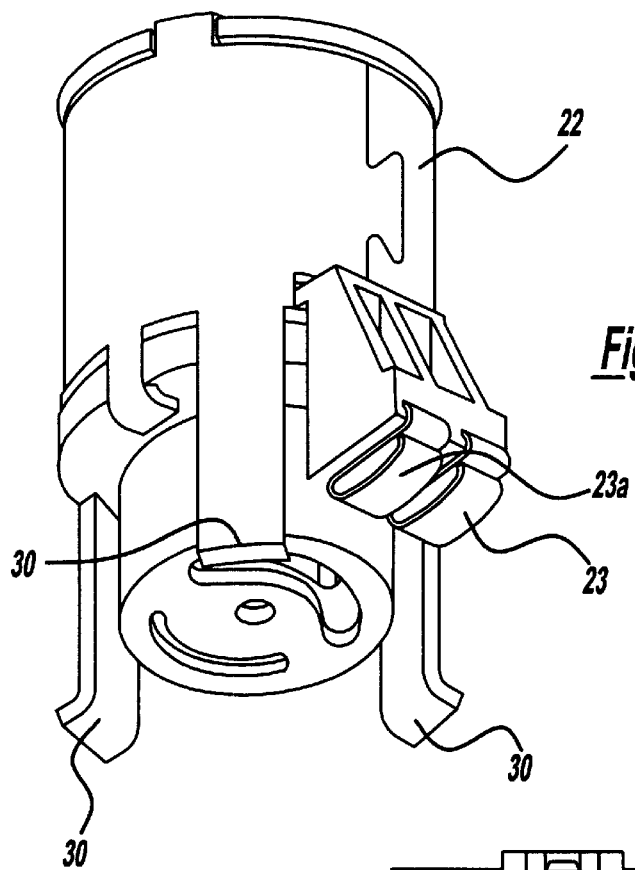
FIG. 5 is a detailed perspective view of a solenoid in accordance with the present invention.

The cooling plate 24 includes a transmission control unit 20 attached thereto. Preferably, the transmission control unit is integrally attached to the cooling plate 24 to provide appropriate cooling. At least one solenoid 22, preferably a plurality of solenoids 22, are attached to the cooling plate. In a preferred embodiment, a Mylar type flex circuit 40 is utilized to electrically connect the solenoids to the control unit by way of the electrical contacts 23 and 23a, as shown in FIG. 5. However, other methods of electrical connection may be utilized, such as circuit board, hard wiring or even a wiring harness or the like. The cooling plate 24 includes a pair of inlet (supply) 26 and outlet (control) 28 ports. The inlet 26 and outlet 28 ports are completed to be placed over particular worm track openings for controlling fluid therethrough. The solenoids 22 are attached on the plate over ports 26 and 28 for the purpose of controlling the hydraulic fluid flow between worm trail passages in the transmission unit.

Figure 6:
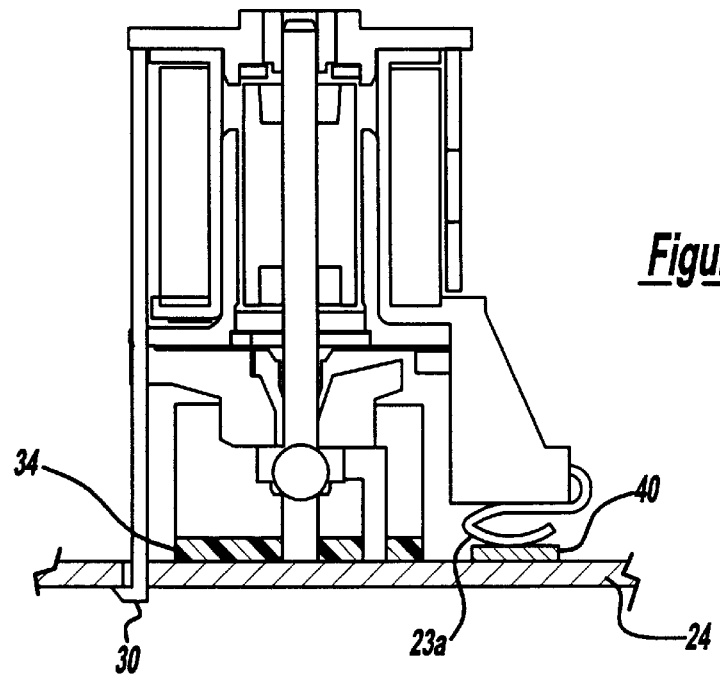
FIG. 6 is a sectional view of the solenoid of FIG. 5.

As shown in FIGS. 5 and 6, the solenoid 22 is attached by way of tangs 30 to the plate 24. A gasket 34 is provided for sealing of the solenoid 22 on the cooling plate 24. Of course, the solenoid can be attached in other manners, which will be known to those skilled in the art, such as by welding, riveting, soldering or the like. Additionally, while separate solenoids are shown attached to the plate, it is readily appreciated that integrally formed banks of multiple solenoids may be utilized and attached to the plate if desired in a particular application. While solenoid selection is application determinative, a suitable solenoid 22 for use in the present invention is a low leak type solenoid like that shown in our co-pending U.S. application Ser. No. 10/034,826, filed Dec. 28, 2001, to Garrett Holmes, et al., entitled "Variable Bleed Solenoid". Any solenoids that are known to those skilled in the art may be utilized, such as on/off solenoids, pulse width modulated solenoids, variable bleed solenoids, variable force solenoids, and of course, proportional and inversely proportional solenoids may be used.

As will be readily appreciated, a connector 36 is provided for connecting the transmission control unit to the engine control computer of the vehicle. Because the transmission control unit is on the transmission, the wiring harness to the engine control computer is simplified over prior designs with remote mounted transmission control units.

While the plate is shown directly attached to the transmission and replaces conventional manifolds formerly utilized for housing solenoids, the plate may optionally include a ditch plate or separator plate 32. The ditch plate 32 may be utilized for performing various routing functions of the hydraulic fluids, as is known to those skilled in the art.

The transmission control unit operatively controls the solenoids. This allows control of the hydraulic pressure and flow in the transmission. The direct solenoid mounting to the transmission control unit cooling plate of the present invention facilitates control of the transmission with an on-board transmission control unit, without the use of a separate conventional solenoid manifold. Thus, weight savings is gained through elimination of the conventional manifold and, also, reduction in wiring costs and weight are achieved by the present invention.

Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A transmission for a motor vehicle comprising:
   a transmission housing including a hydraulic control valve body having at least one worm trail or passage therein for hydraulic control of internal transmission functions, and said hydraulic control valve body open to the interior of the transmission;
   a control module for covering and sealing said valve body;
   said control module including a transmission control unit attached to a cooling plate, and at least one solenoid attached to said cooling plate;
   said solenoid electrically connected to said transmission control unit;
   said solenoid including an inlet and an outlet for control of hydraulic fluid from said inlet to said outlet for control of a fluid flow in response to signals from said transmission control unit;
   said cooling plate including ports therethrough, said ports allowing for communication between control passages in said transmission for controlling of a function in said transmission.

2. The transmission of claim 1 wherein a group of solenoids is placed on said cooling plate.

3. The transmission of claim 1 wherein said at least one solenoid is connected electronically with said transmission control unit through a flex circuit.

4. The transmission of claim 1 wherein said at least one solenoid is connected to said transmission control unit through a wiring harness.

5. The transmission of claim 1 wherein said at least one solenoid is connected electronically with said transmission control unit through hard wiring.

6. The transmission of claim 1 wherein a ditch plate is interposed between said cooling plate and said valve body for directing fluid flow between said valve body and said at least one solenoid.

7. The transmission of claim 1 wherein at least one proportional and one inversely proportional solenoid is provided on said cooling plate.

8. The transmission of claim 1 wherein said solenoid is selected from the group consisting of on/off solenoids, pulse width modulated solenoids, variable bleed solenoids and variable force solenoids.

9. The transmission of claim 1 wherein an inlet and outlet port is provided through said plate at the location of said solenoid and said ports.

10. The transmission of claim 4 wherein said wiring harness is a flex circuit.

11. The transmission of claim 5 wherein said hard wiring is a circuit board.

12. The transmission of claim 11 wherein said circuit board is an overmolded circuit.

13. A control module for control of a hydraulic vehicle transmission having an interior opening of worm trails therein for distributing of hydraulic fluid, said control module comprising:
   a cooling plate including at least an inlet and outlet port therethrough for communicating with a preselected hydraulic passage or control worm trail in the transmission;
   a transmission control unit attached to said cooling plate providing transmission control unit cooling; and
   at least one solenoid attached to said cooling plate and interposed between an inlet and said outlet for controlling hydraulic flow through said worm trails in said transmission.

14. The control module of claim 13 wherein a group of solenoids is placed on said cooling plate.

15. The control module of claim 13 wherein said at least one solenoid is connected electronically with said transmission control unit through a flex circuit.

16. The control module of claim 13 wherein said at least one solenoid is connected to said transmission control unit through a wiring harness.

17. The control module of claim 13 wherein said at least one solenoid is connected electronically with said transmission control unit through hard wiring.

18. The control module of claim 13 wherein a ditch plate is interposed between said cooling plate and control passages in said transmission for directing fluid flow between said control passages and said at least one solenoid.

19. The control module of claim 13 wherein at least one proportional and one inversely proportional solenoid is provided on said cooling pate.

20. The control module of claim 13 wherein said solenoid is selected from the group consisting of on/off solenoids, pulse width modulated solenoids, variable bleed solenoids and variable force solenoids.

21. The control module of claim 13 wherein an inlet and outlet port is provided through said plate at the location of said solenoid and said ports.

22. The control module of claim 17 wherein said hard wiring is a circuit board.

23. The control module of claim 17 wherein said hard wiring is an overmolded circuit.

* * * * *

UNITED STATES PATENT AND TRADEMARK OFFICE
CERTIFICATE OF CORRECTION

PATENT NO. : 6,544,138 B2
DATED : April 8, 2003
INVENTOR(S) : Ryan M. True et al.

It is certified that error appears in the above-identified patent and that said Letters Patent is hereby corrected as shown below:

<u>Title page,</u>
Item [73], Assignee, "Borg-Warner Automotive, Inc." should be
-- BorgWarner Inc. --.

Signed and Sealed this

Twenty-first Day of December, 2004

JON W. DUDAS
*Director of the United States Patent and Trademark Office*